United States Patent
Wei et al.

(10) Patent No.: US 11,839,853 B2
(45) Date of Patent: Dec. 12, 2023

(54) OSMOTIC PRESSURE ASSISTED REVERSE OSMOSIS MEMBRANE AND MODULE

(71) Applicant: TREVI SYSTEMS INC., Rohnert Park, CA (US)

(72) Inventors: Qiang Wei, Petaluma, CA (US); Elliott Baker, Petaluma, CA (US); John Webley, Petaluma, CA (US); Gary Carmignani, Petaluma, CA (US)

(73) Assignee: Trevi Systems, Inc., Rohnert Park, CA (US)

( * ) Notice: Subject to any disclaimer, the term of this patent is extended or adjusted under 35 U.S.C. 154(b) by 455 days.

(21) Appl. No.: 16/487,055

(22) PCT Filed: Jan. 20, 2017

(86) PCT No.: PCT/US2017/014269
§ 371 (c)(1),
(2) Date: Aug. 19, 2019

(87) PCT Pub. No.: WO2018/136077
PCT Pub. Date: Jul. 26, 2018

(65) Prior Publication Data
US 2021/0275968 A1    Sep. 9, 2021

(51) Int. Cl.
*B01D 61/02* (2006.01)
*B01D 61/08* (2006.01)
(Continued)

(52) U.S. Cl.
CPC .......... *B01D 61/025* (2013.01); *B01D 61/08* (2013.01); *B01D 63/043* (2013.01);
(Continued)

(58) Field of Classification Search
CPC .... B01D 61/025; B01D 61/08; B01D 63/043; B01D 63/103; B01D 69/06; B01D 69/08;
(Continued)

(56) References Cited

U.S. PATENT DOCUMENTS 4,033,878 A * 7/1977 Foreman .............. B01D 63/103
210/336
4,789,480 A   12/1988 Bruschke
(Continued)

FOREIGN PATENT DOCUMENTS

KR      101344784 B1     12/2013
WO    2007/030647 A2     3/2007
(Continued)

OTHER PUBLICATIONS

Supplemental European Search Report dated Jan. 15, 2021.
(Continued)

*Primary Examiner* — Bradley R Spies
*Assistant Examiner* — Jeannie McDermott
(74) *Attorney, Agent, or Firm* — Polsinelli PC

(57) ABSTRACT

Membranes and filtration modules for producing a concentrated feed stream and a diluted feed stream during operation in a water purification or wastewater treatment system. Filtration modules are provided that include a semipermeable membrane having a first side and a second side, the first side configured to receive a first feed solution stream from a first feed solution source and the second side configured to receive a second feed solution stream from a second feed solution source. The semipermeable membrane may be configured to operate at a hydrostatic pressure on the second side of the membrane from about 1% to about 40% of the hydrostatic pressure on the first side of the membrane, and may in some cases exhibit a salt rejection of from about 60 percent to about 90 percent during operation.

12 Claims, 10 Drawing Sheets

(51) Int. Cl.
  *B01D 63/04*   (2006.01)
  *B01D 63/10*   (2006.01)
  *B01D 69/06*   (2006.01)
  *C02F 103/08*  (2006.01)
  *B01D 69/08*   (2006.01)
  *B01D 71/06*   (2006.01)
  *C02F 1/44*    (2023.01)

(52) U.S. Cl.
  CPC .......... *B01D 63/103* (2013.01); *B01D 69/06* (2013.01); *B01D 69/08* (2013.01); *B01D 71/06* (2013.01); *C02F 1/441* (2013.01); *B01D 2313/04* (2013.01); *B01D 2313/146* (2013.01); *B01D 2313/24* (2013.01); *C02F 2103/08* (2013.01)

(58) Field of Classification Search
  CPC ............ B01D 71/06; B01D 2313/04; B01D 2313/146; B01D 2313/24; B01D 63/02; B01D 63/10; B01D 2311/14; B01D 2317/022; B01D 2317/06; B01D 61/002; C02F 1/441; C02F 2103/08; C02F 2103/365; C02F 1/445; C02F 2103/10; C02F 2209/03; Y02A 20/131
  See application file for complete search history.

(56) References Cited

U.S. PATENT DOCUMENTS

| | | | |
|---|---|---|---|
| 4,906,372 A | 3/1990 | Hopkins | |
| 5,034,126 A | 7/1991 | Reddy et al. | |
| 5,580,452 A | 12/1996 | Lin | |
| 6,528,214 B1 | 3/2003 | Pliner et al. | |
| 7,901,577 B2 | 3/2011 | Sengupta et al. | |
| 8,617,397 B2 | 12/2013 | Ikeyama et al. | |
| 2006/0011544 A1 | 1/2006 | Sharma et al. | |
| 2008/0296208 A1* | 12/2008 | Ikeyama | B01D 61/12 210/87 |
| 2010/0032377 A1 | 2/2010 | Wohlert | |
| 2010/0224550 A1* | 9/2010 | Herron | B01D 63/12 210/321.74 |
| 2011/0036774 A1* | 2/2011 | McGinnis | B01D 63/103 210/321.74 |
| 2011/0084026 A1* | 4/2011 | Freger | B01D 69/12 210/653 |
| 2012/0067820 A1 | 3/2012 | Henthorne et al. | |
| 2014/0021135 A1* | 1/2014 | Sawyer | C02F 1/442 210/652 |
| 2015/0265976 A1* | 9/2015 | Shimizu | B01D 63/028 210/644 |
| 2015/0367285 A1 | 12/2015 | Chang et al. | |
| 2016/0002074 A1* | 1/2016 | Benton | B01D 61/02 210/636 |
| 2017/0080389 A1* | 3/2017 | Kelada | B01D 65/02 |
| 2017/0106340 A1* | 4/2017 | Kim | B01D 61/58 |
| 2018/0147532 A1* | 5/2018 | Switzer | B01D 61/58 |
| 2018/0162758 A1* | 6/2018 | Cantrell | C02F 1/4691 |
| 2019/0009218 A1* | 1/2019 | Choong | B01D 61/58 |
| 2019/0076791 A1* | 3/2019 | Ohkame | B01D 71/82 |

FOREIGN PATENT DOCUMENTS

| | | |
|---|---|---|
| WO | 2010/104895 A2 | 9/2010 |
| WO | 2016139494 A1 | 9/2016 |
| WO | 2016167267 A1 | 10/2016 |
| WO | 2018136077 A1 | 7/2018 |

OTHER PUBLICATIONS

International Search Report and Written Opinion; PCT Application PCT/US2017/014269; dated May 23, 2017.

Notice of Decision from Saudi Arabia application 519402264, dated Dec. 27, 2021.

* cited by examiner

OSMOTIC PRESSURE ASSISTED REVERSE OSMOSIS MEMBRANE AND MODULE

CROSS-REFERENCE TO RELATED APPLICATIONS

This application is a National Stage Entry of PCT/US2017/014269, entitled "Osmotic Pressure Assisted Reverse Osmosis Membrane and Module," filed Jan. 20, 2017, the contents of which is incorporated herein by reference, for all purposes, in its entirety.

FIELD OF TECHNOLOGY

The present disclosure is directed to the purification, decontamination, or desalination of sea water, brackish water, waste water, industrial water, produced water and/or contaminated water using membranes and filter modules suited to an osmotic pressure assisted reverse osmosis process. The present disclosure is further directed to forming concentrated feedstock solutions using osmotic pressure assisted reverse osmosis membranes and filter modules and producing purified water as a by-product.

BACKGROUND

Certain membranes allow solvent molecules to pass through them but not solute molecules. Such membranes are referred to as semipermeable. Semipermeable membranes can be utilized in desalination and water purification technologies.

Forward osmosis is known in the art and has been the subject of recent study due to the likelihood of future fresh water shortages and a corresponding increase in demand for cost effective desalination and water purification technologies. Sea water, brackish water or otherwise contaminated water can be purified by drawing the water (the solvent) through a semipermeable membrane, which rejects the salts and other contaminants (the solutes). In forward osmosis processes, the water is drawn through the semipermeable membrane using a draw solution with higher osmotic pressure than the feed. The forward osmosis process does not purify the water. Forward osmosis simply moves the water from one set of solutes to another set of solutes.

The process of reverse osmosis has also been applied in water purification technologies. In particular, reverse osmosis has been used to desalinate sea water, brackish water or otherwise contaminated water by removing salts from the water to make drinkable or otherwise industrially usable water. In forward osmosis, solvent flows from a dilute solution through a semipermeable membrane to a more concentrated solution. By applying a pressure equal to the osmotic pressure to the more concentrated solution, the osmotic process can be stopped. By applying an even greater pressure, the osmotic process can be reversed. In this instance, solvent flows from the concentrated solution (such as sea water) through the semipermeable membrane to the more dilute solution. The hydrostatic pressure requirements of reverse osmosis can make reverse osmosis energetically expensive. Additionally, the evaporation and crystallization processes involved in zero liquid discharge (ZLD) systems, used to concentrate solutes beyond that of traditional RO, are also costly. Therefore, membranes and filtering modules suited for apparatus and systems capable of reducing the energy costs or increasing the efficiency of reverse osmosis systems and other water purification systems are desirable.

BRIEF DESCRIPTION OF THE DRAWINGS

Embodiments of the present application are described, by way of example only, with reference to the attached Figures, wherein.

Figure 1:
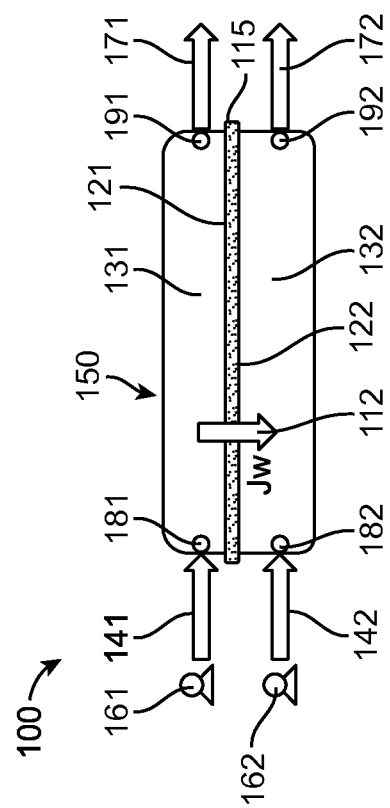
FIG. 1 is a diagram of a filtering module and membrane suited for use in an osmotic pressure assisted reverse osmosis (OsARO) system, according to an example embodiment of the present disclosure.

It should be understood that the various aspects are not limited to the arrangements and instrumentality shown in the drawings.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented. The term "OsARO" refers to osmotic assisted reverse osmosis and can also be referred to as forward osmosis pre-treatment reverse osmosis (FO-PRO) or forward osmosis osmotic recovery membrane (FO-ORM). The term "coupled" is defined as connected, whether directly or indirectly through intervening components, and is not necessarily limited to physical connections. The term "fluidically coupled" is defined as connected, either directly or indirectly through intervening components, and the connections are not necessarily limited to physical connections, but are connections that accommodate the transfer of solutions, dispersions, mixtures, or other fluids between the so-described components. The connections can be such that the objects are permanently connected or reversibly connected. The terms "comprising," "including" and "having" are used interchangeably in this disclosure. The terms "comprising," "including" and "having" mean to include, but are not necessarily limited to, the things so described.

As used herein, the terms "purify," "purified," or "purification," in their various forms, refer to one or more processes that produce water having at least an incremental increase in purity and/or an incremental decrease in solute concentration or contaminant concentration. As such, the terms "purify," "purified," or "purification," do not necessarily refer to the production of water having a particular purity or a particular solute concentration, rather, the terms are used to refer to the production of water having at least an incremental increase in purity and/or an incremental decrease in solute concentration or contaminant concentration, resulting from the presently disclosed methods and techniques.

As used herein, the term "stream," in its various forms, including its use in the term "feed stream," refers to a solution that may be flowed to or received in a portion or component of an apparatus or system of the present disclosure, and is not limited to solutions introduced into an apparatus or system, or portion thereof, under continuous flow, but rather, may also include solutions received in an apparatus or system for a period of time, such as that which may be employed in a series of batch processes.

As used herein, the term "permeate channel," refers to any channel, pathway, or reservoir in the permeate spacer capable of receiving permeate solution and/or a second feed solution stream and that is further capable of providing flow of the permeate solution and/or the second feed solution stream through the permeate spacer. The term "permeate channel," as used herein, may refer equally to a single pathway, a plurality of pathways, or a network of pathways capable of receiving the permeate solution and/or second feed solution stream and further capable of providing for flow of the permeate solution and/or the second feed solution stream through the permeate spacer.

According to at least one aspect of the present disclosure, a filtration module is provided. The filtration module may include a semipermeable membrane having a first side configured to receive a first feed solution stream from a first feed solution source and a second side configured to receive a second feed solution stream from a second feed solution source. The filter module may further include a semipermeable membrane that is configured to pass a solvent of the first feed solution stream, in the form of a permeate solution, from a first side of the membrane to the second side of the membrane upon the application of hydrostatic pressure to the first side and the second side of the membrane. The semipermeable membrane may be configured to operate at a hydrostatic pressure on the second side of the membrane from about 1% to about 40% of the hydrostatic pressure on the first side of the membrane. In at least some instances, the membrane may be configured to operate at a pressure of from about 10 bar to about 120 bar on the first side of the membrane and at a pressure of from about 2 bar to about 20 bar on the second side of the membrane. In at least some instances, the membrane may exhibit a salt rejection of from about 60 percent to about 90 percent during operation in a desalination, ZLD, or near-ZLD wastewater treatment system.

In at least one other aspect of the present disclosure, a filtration module is provided that includes a first chamber and a second chamber. A semipermeable membrane is disposed at the interface between the first chamber and the second chamber. The semipermeable membrane has a first side in fluidic communication with the first chamber and a second side in fluidic communication with the second chamber. The first chamber is configured to receive a first feed solution stream from a first feed solution source and the second chamber is configured to receive a second feed solution stream from a second feed solution source. The semipermeable membrane is configured to pass a solvent of the first feed solution stream, in the form of a permeate solution, from the first side of the membrane to the second side of the membrane upon the application of hydrostatic pressure to the first side and the second side of the membrane. The semipermeable membrane may be configured to operate at a hydrostatic pressure on the second side of the membrane from about 1% to about 40% of the hydrostatic pressure on the first side of the membrane. In at least some instances, the membrane may be configured to operate at a pressure of from about 10 bar to about 120 bar on the first side of the membrane and at a pressure of from about 2 bar to about 20 bar on the second side of the membrane. In at least some instances, the membrane may exhibit a salt rejection of from about 60 percent to about 90 percent during operation in a desalination, ZLD, or near-ZLD wastewater treatment system.

FIG. 1 illustrates an apparatus 100 according to an example embodiment of the present disclosure. As depicted in FIG. 1, apparatus 100 includes an OsARO filtration module 150 for concentrating a first feed solution 141 while diluting a second feed solution 142 using a semipermeable membrane 115. The OsARO filtration module includes a first chamber 131 and a second chamber 132 opposite the first chamber 131. A semipermeable membrane 115 is disposed at the interface between the first chamber 131 and the second chamber 132. The semipermeable membrane 115 has a first side 121 in fluidic communication with the first chamber 131 and a second side 122 in fluidic communication with the second chamber 132.

During operation, the OsARO filtration module 150 is configured to receive a first feed solution stream 141 having a solute concentration C1 and osmotic pressure $\pi(C1)$. The first feed solution stream 141 is introduced to first chamber 131 and the first side 121 of semipermeable membrane 115 while subjected to hydraulic pressure P1. In at least some instances, the first feed solution stream 141 enters the first chamber 131 via an inlet port, such as inlet port 181 shown in FIG. 1.

The OsARO filtration module 150 is further configured to receive a second feed solution stream 142 into the second chamber 132 and on the second side 122 of semipermeable membrane 115. The second feed solution stream 142, has a solute concentration C2 and an osmotic pressure $\pi(C2)$ that is smaller or equal to the osmotic pressure $\pi(C1)$ of the first feed solution stream 141 fed on the opposite first side 121 of the semipermeable membrane 115. The second feed solution stream 142 is fed into the second chamber 132 and on the second side 122 of the semipermeable membrane 115 at a hydraulic pressure P2 that is less than the hydraulic pressure P1 of the first feed solution stream 141. In some instances, the solute concentration C1 of the first feed solution stream 141 is greater than the solute concentration C2 of the second feed solution stream 142. In other instances, the solute concentrations C1 and C2 can be the same. In at least some instances, the second feed solution stream 142 enters the second chamber 132 via an inlet port, such as inlet port 182 shown in FIG. 1.

As a result of the balance of hydraulic pressures and osmotic pressures, solvent, in the form of permeate 112 passes from the first chamber 131 to the second chamber 132 via semipermeable membrane 115, thereby concentrating the first feed solution stream 141 ($C1_{out}$>$C1_{in}$) to form a concentrated first feed solution stream 171 while diluting the second feed solution stream 142 ($C2_{in}$>$C2_{out}$) to form a diluted second feed solution stream 172. According to the presently disclosed technique, the reverse osmosis (RO) process is assisted by the osmotic pressure provided by the second feed solution stream 142, resulting in a more energetically efficient Osmotic Pressure Assisted Reverse Osmosis (OsARO) process.

According to at least one aspect of the present disclosure, the first chamber 131 of OsARO filtration module 150 may be fluidically coupled with a first feed solution source 161 configured to flow the first feed solution stream 141 to the first chamber 131 and on the first side 121 of semipermeable membrane 115. The first feed solution source 161 may be a high pressure pump, as depicted in FIG. 1, or may be, in at least some instances, the first or second chamber of another OsARO filtration module. In at least some instances, the first feed solution source 161 may be a reverse osmosis component or a forward osmosis component.

Similarly, in at least some instances, the second chamber 132 of OsARO filtration module 150 may be fluidically coupled with a second feed solution source 162 configured to flow the second feed solution stream 142 to the second chamber 132 and on the second side 122 of semipermeable membrane 115. The second feed solution source 162 may be a low pressure or high pressure pump, as depicted in FIG. 1, or may be, in at least some instances, the first or second chamber of another OsARO filtration module, a reverse osmosis component, or a forward osmosis component.

According to at least one aspect of the present disclosure, the osmotic pressure of the second feed solution stream 142 is greater than the osmotic pressure of the permeate 112. In at least some instances, the first feed solution source 161 and the second feed solution source 162 may be configured to generate a pressure differential between the hydrostatic pressure of the first feed solution stream 141 and the second feed solution stream 142 sufficient to cause solvent to pass from the first side 121 of the semipermeable membrane 115 to the second side 122 of the semipermeable membrane 115 in the form of permeate 112. In some cases, the first feed solution source 161 and the second feed solution source 162 may be configured to vary the pressure differential as a function of the osmotic pressure of the second feed solution stream 142.

According to at least one aspect of the present disclosure, the concentrated first feed solution stream 171 may exit the first chamber 131 of the OsARO filtration module 150 at an exit port, such as exit port 191 depicted in FIG. 1. Similarly, the diluted second feed solution stream 172 may exit the second chamber 132 of the OsARO filtration module 150 at an exit port, such as exit port 192 depicted in FIG. 1. While the OsARO filtration module 150 depicted in FIG. 1 is depicted as only having a single inlet port and exit port for each of the chambers, first or second chambers having multiple inlet and/or exit ports are within the spirit and scope of the present disclosure.

According to at least one aspect of the present disclosure, the concentrated first feed solution stream 171 and/or the diluted second feed solution stream 172 may be fed to another OsARO filtration module or to a reverse osmosis component or a forward osmosis component. In at least some instances, the first feed solution source 161 may be configured to recirculate the concentrated first feed solution stream 171, or a portion thereof, to the first side 121 of the semipermeable membrane 115. In some cases, the second feed solution source 162 may be configured to provide at least a portion of the concentrated first feed solution stream 171 to the second side 122 of the semipermeable membrane 115.

According to at least one aspect of the present disclosure, the first feed solution stream 141 may be a contaminated solution. In some cases, the contaminated solution may be divided into at least two portions, with one portion forming the first feed solution stream 141 and another portion forming the second feed solution stream 142. In such instances, the first feed solution source 161 and the second feed solution source 162 are each configured to provide portions of the same contaminated solution to the first side 121 and second side 122 of the semipermeable membrane 115, respectively.

The first feed solution stream 141 and the second feed solution stream 142 can have the same or different chemical composition, and can be at the same temperature or a different temperature. The first and second feed solution streams can include of many different solution components, some of the solution components may contribute to the osmotic pressure, while others may not. Any solution that generates osmotic pressure can be used in the presently disclosed apparatus, systems, and methods.

In at least some instances, the solvent of either the first or second feed solution stream can be water, an inorganic salt, a polar organic solvent such as methanol or ethanol, or any other suitable solvent. In some instances, feed solution streams having inorganic salt solutes such as, for example, sodium chloride (NaCl), potassium chloride (KCl), magnesium chloride ($MgCl_2$), magnesium carbonate ($MgCO_3$), magnesium sulfate ($MgSO_4$), calcium chloride ($CaCl_2$), calcium sulfate ($CaSO_4$), calcium carbonate ($CaCO_3$), potassium acetate (KAc) or calcium magnesium acetate (CaMgAc) can be used. In other instances, feed solution streams having inorganic salt solutes comprising ionic species such as, for example, transition metals, lanthanides, and actinides can be used. In yet other instances, feed solution streams having inorganic salt solutes comprising species such as, for example cyanides, nitrates, nitrites, sulfates, sulfites, sulfonates, hydroxides, phosphates, phosphites, halides, acetates, arsenides, amines, carboxylates, and nitros can be used. In some instances, when water is the solvent, organic compound solutes having good water solubility such as, for example, alcohols, dioxane, acetone, tetrahydrofuran (THF), dimethyl formamide (DMF), and dimethyl sulfoxide (DMSO) can be used. In some instances, organic compound solutes having water solubility such as aromatics such as toluene and benzene, linear alkanes or alkenes such as hexane or octane, chlorinated solvents such as methylene chloride ($CH_2Cl_2$), organic sulfonates, and organic acid may be used as solutes in the feed solution streams. In some instances polymer solutes, such as, but not limited to, sugar, ethylene oxide (EO), propylene oxide (PO), polyethylene glycols (PEG), poly(acrylic acid), poly(vinyl alcohol) poly (ethylene oxide), poly(vinyl acid), poly(styrenesulfonate), poly(acrylamide)-based polyelectrolytes, poly(diallyldimethylammonium chloride), poly(allylamine hydrochloride), poly(vinylpyrrolidone), poly(N-isopropylacrylamide), poly (alkylacrylates), polyalkylacrylic acids, poly(2-oxazoline) and polyethylenimine, and copolymers or block copolymers thereof, or any combination thereof can be used.

Figure 2:
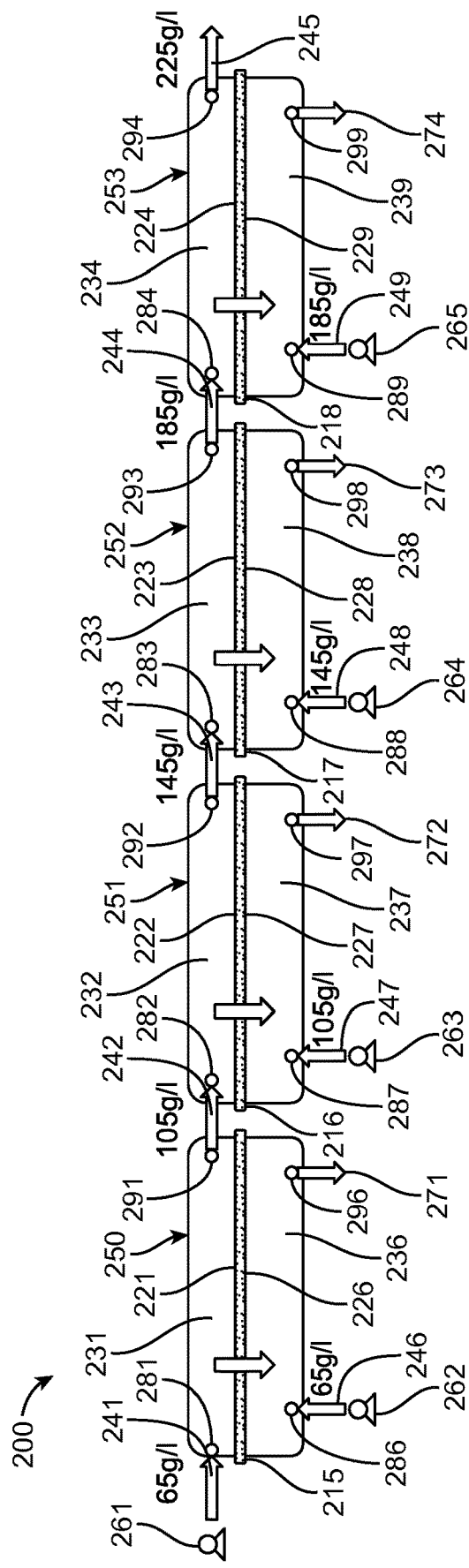
FIG. 2 is a diagram of a multiple stage OsARO system, according to an example embodiment of the present disclosure.
Figure 3:
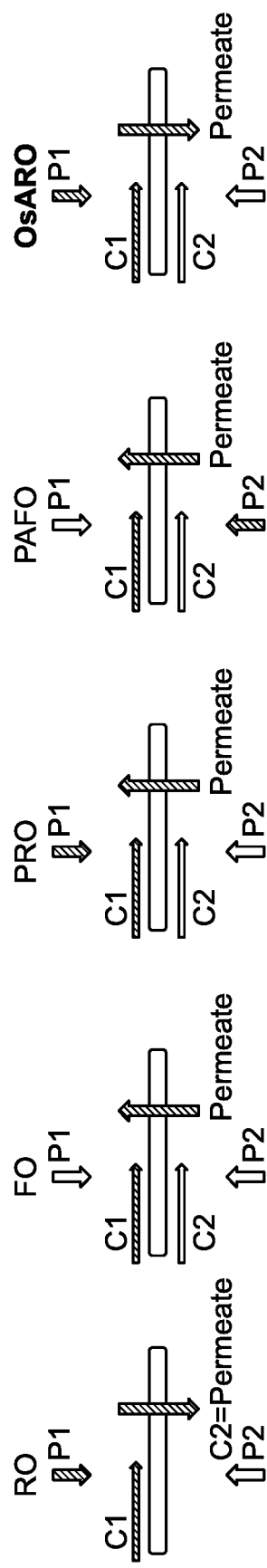
FIG. 3A-E is a series of diagrams comparing the OsARO system to reverse osmosis (RO), forward osmosis (FO), pressure retarded osmosis (PRO), and pressure assisted FO (PAFO) systems, according to an example embodiment of the present disclosure.

FIG. 2 illustrates an apparatus 200, according to an example embodiment of the present disclosure. As depicted in FIG. 2, apparatus 200 includes multiple OsARO filtration modules 250-253 fluidically coupled to each other in a series for successive separation steps or stages, in which the initial first feed solution stream 241 can be incrementally concentrated to higher concentrations. Each OsARO filtration module 250-253 includes a first chamber 231-234, a second chamber 236-239 and a semipermeable membrane 215-218 disposed at the interface between the first chamber 231-234 and the second chamber 236-239. Each semipermeable membrane 215-218 has a first side 221-224 in fluidic communication with the first chamber 231-234 and a second side 226-229 in fluidic communication with the second chamber 236-239.

During operation, the first OsARO filtration module 250 is configured to receive an initial first feed solution stream 241. The initial first feed solution stream 241 is introduced to the first chamber 231 of the first filtration module 250 as well as the first side 221 of semipermeable membrane 215 while subjected to hydraulic pressure. As depicted in FIG. 2, the initial first feed solution stream 241 enters the first chamber 231 via inlet port 281 from first feed solution source 261. The first filtration module 250 is further configured to receive a second feed solution stream 246, from second feed solution source 262, into the second chamber 236 and on the second side 226 of semipermeable membrane 215. The first feed solution source 261 and the second feed solution source 262 may be a high pressure pump or may be a reverse osmosis component or a forward osmosis component.

By way of example only, FIG. 2 depicts that the solute concentration of the initial first feed solution stream 241 is initially 65 g/l NaCl, matching the solute concentration of the second feed solution stream 246. The solute concentration of the feed solution streams may be any value so long as the osmotic pressure of the second feed solution stream 246 is smaller or equal to the osmotic pressure of the initial first feed solution stream 241 and the solute concentration of the second feed solution stream 246 is sufficient to assist the reverse osmosis process by reducing the required hydrostatic pressure necessary to produce permeate. In at least some instances, the use of a second feed solution stream having a solute concentration that is approximately equal to the solute concentration of the first feed solution stream, as depicted in FIG. 2, is advantageous because the second feed solution stream provides a significant osmotic pressure by which to facilitate the reverse osmosis process. In at least some cases, the osmotic pressure differential across the membrane may be decreased to near zero in order to reduce the hydraulic pressure necessary to perform the process.

During operation, hydraulic pressure is exerted by the initial first feed solution stream 241 on the first side 221 of the semipermeable membrane 215 such that solvent passes from the first side 221 of the of the semipermeable membrane 215 to the second side 226 of the semipermeable membrane 215 thereby producing a concentrated first feed solution stream 242 in the first chamber of the first module 250 and a diluted second feed solution 271 in the second chamber 236. The example embodiment presented in FIG. 2 illustrates that the initial first feed solution stream 41 having a solute concentration of 65 g/l NaCl is concentrated to 105 g/l NaCl during operation of the first module 250, or first stage, of apparatus 200. As depicted in FIG. 2, the concentrated first feed solution is fed into the first chamber 232 of the second OsARO filtration module 251, in the form of third feed solution stream 242, where the third feed solution stream is concentrated to 145 g/l NaCl due to the same process describe with respect to the first module 250. The concentrated third feed solution stream is then fed into the first chamber 233 of the third OsARO filtration module 252, in the form of fifth feed solution stream 243 where the fifth feed solution stream 243 is concentrated to 185 g/l NaCl. The concentrated fifth feed solution stream is then fed into the first chamber 234 of the fourth OsARO filtration module 253, in the form of seventh feed solution stream 244, where the seventh feed solution stream is concentrated to the targeted concentration of 225 g/l at exit port 294. In each filtration module 250-253, a different feed solution stream 246-249, each having a defined concentration C2 is introduced to the respective second chamber 236-239 in order to provide osmotic pressure driving force to assist the concentration of the feed solution streams in the respective first chambers 231-234.

In at least some instances, feed solution streams 247-249 may be fed to the second chambers 237-239 of modules 251-253 from feed solution sources 263-265. In some cases, feed solution sources 263-265 may be low pressure or high pressure pumps. In other cases, feed solution streams 247-249 may include at least a portion of the concentrated feed streams 242-244 of the preceding module. In such cases, the feed solution sources 263-265 may be the first chambers 231-233 of the preceding module 250-252. For example, the fourth feed solution stream 247 may comprise at least a portion of concentrated first feed solution stream 242 from the first chamber 231 of the first module 250.

According to at least one aspect of the present disclosure, the diluted feed solution streams 271-274 may be fed to another OsARO filtration module or to a reverse osmosis component, as described with respect to additional exemplary embodiments provided below. For example, the diluted feed solution stream 272 from the second chamber 237 of the second module 251 may be fed to the second chamber 236 of the first filtration module 250 to form, at least in part, the second feed solution stream 246.

As depicted in FIG. 2, the first chambers 231-234 of OsARO filtration modules 250-253 have inlet ports 281-284 providing an entry path for feed solution streams into the first chambers 231-234. Additionally, the first chambers 231-234 have outlet ports 291-294 providing an exit path for the concentrated feed solution stream to leave the first chambers 231-234 and enter a subsequent stage or module. Similarly, the second chambers 236-239 include inlet ports 286-289 and exit ports 296-299 to allow entry and exit of the feed solution streams to and from the second chambers 236-239. In some instances, the OsARO modules can be configured to have multiple inlet ports and multiple exit ports for each of the respective feed solution streams. Furthermore, the OsARO filtration modules can be used in continuous, batch, or semi-batch processes. In each process in each filtration module, the feed solution streams can pass through the membrane a single time, or multiple times by recycling and recirculating. Additionally, the hydraulic pressure applied to the feed solution streams can be held constant or can be varied during the respective process steps.

According to at least one aspect of the present disclosure, apparatus 200, depicted in FIG. 2, may be used to perform a process for concentrating a solute, such as a contaminant, in a solution comprising solvent and solute. The process includes providing a first filtration module 250 fluidically coupled with a first feed solution source 261 and a second feed solution source 262. The first filtration module 250 may include a first chamber 231 and a second chamber 236. The first filtration module 250 may further include a semipermeable membrane 215 disposed at the interface between the first chamber 231 and the second chamber 236. The semipermeable membrane 215 may have a first side 221 in fluidic communication with the first chamber 231 and a second side 226 in fluidic communication with the second chamber 236. The process further includes introducing, from the first feed solution source 261, a first feed solution stream 241 to the first chamber 231 and on the first side 221 of the semipermeable membrane 215.

The process further includes introducing, from the second feed solution source 262, a second feed solution stream 246 to the second chamber 236 and on the second side 226 of the semipermeable membrane 215. The osmotic pressure of the first feed solution stream 241 is greater than or equal to the osmotic pressure of the second feed solution stream 246. The process further includes exerting hydrostatic pressure on the first side 221 of the semipermeable membrane 215 such that solvent passes from the first side 221 to the second side 226 of the semipermeable membrane 215 thereby producing a concentrated feed solution stream 242 in the first chamber 231 and a diluted second feed solution stream 271 in the second chamber 236.

In at least some instances, the process may further include selecting the osmotic pressure of the second feed solution stream 246 so as to reduce the hydrostatic pressure needed to cause the solvent to pass from the first side 221 to the second side 226 of the semipermeable membrane 215, thereby producing a concentrated feed solution stream 242 and a diluted second feed solution stream 271. In other cases, the osmotic pressure of the second feed solution stream 246 may be a predetermined osmotic pressure selected to reduce the hydrostatic pressure necessary to cause the solvent to pass from the first side 221 to the second side 226 of the semipermeable membrane 215. In some cases, the osmotic pressure of the second feed solution stream 246 may be selected to be greater than the osmotic pressure of the permeate solution so as to reduce the hydrostatic pressure needed to cause the solvent to pass from the first side 221 to the second side 226 of the semipermeable membrane 215.

According to at least one aspect of the present disclosure, the process may further include recirculating the concentrated first feed solution stream 242, or a portion thereof, to the first side 221 of the semipermeable membrane 215. The process may further include recirculating at least a portion of the concentrated first feed solution stream 242 to the second side 226 of the semipermeable membrane 215.

In at least some instances, the process further includes providing a second filtration module 251 fluidically coupled with the first module 250 and a fourth feed solution source 263. The second module 251 includes a first chamber 232 and a second chamber 237. The second filtration module 251 further includes a semipermeable membrane 216 disposed at the interface between the first chamber 232 and the second chamber 237. The semipermeable membrane 216 includes a first side 222 in fluidic communication with the first chamber 232 and a second side 227 in fluidic communication with the second chamber 237. The process further includes introducing, from the first chamber 231 of the first filtration module 250, a third feed solution stream 242 to the first chamber 232 of the second filtration module 251. The third feed solution stream 242 may include at least a portion of the concentrated first feed solution stream. The process further includes introducing, from the fourth feed solution source 263, a fourth feed solution stream 247 to the second chamber 237 of the second filtration module 251 and on the second side 227 of the semipermeable membrane 216. The osmotic pressure of the third feed solution stream 242 is greater than or equal to the osmotic pressure of the fourth feed solution stream 247. The process further includes exerting hydrostatic pressure on the first side 222 of the semipermeable membrane 216 of the second module 251 such that solvent passes from the first side 222 of the semipermeable membrane 216 to the second side 227 of the semipermeable membrane 216 thereby producing a concentrated third feed solution stream 243 in the first chamber 232 of the second module 251 and a diluted fourth feed solution stream 272 in the second chamber 237 of the second module 251.

The fourth feed source 263 may be a high pressure pump or may be the first chamber 231 of the first module 250. In such cases, the fourth feed solution stream 247 may include at least a portion of the concentrated feed solution stream 242 from the first chamber 231 of the first filtration module 250.

In addition to providing processes for concentrating a solution, the present disclosure further provides processes for purifying a solvent from a solute solution. For example, the OsARO filtration modules depicted in FIGS. 1 and 2, and described above, may be combined with a reverse osmosis (RO) component and a forward osmosis (FO) component to produce a purified solvent product, such as water permeate. More particularly, the process for purifying a solvent may include providing a forward osmosis (FO) component fluidically coupled with a reverse osmosis (RO) component and a filtration module. The filtration module may include a first chamber fluidically coupled with the RO component and the FO component, as well as a second chamber fluidically coupled with the RO component. The filtration module may further include a semipermeable membrane disposed at the interface between the first chamber and the second chamber. The semipermeable membrane may include a first side in fluidic communication with the first chamber and a second side in fluidic communication with the second chamber.

The process further includes introducing a contaminated FO feed solution to the FO component. The contaminated FO feed solution includes a solvent contaminated with one or more solutes. The process further includes causing the FO component to produce a concentrated FO feed solution stream and a diluted draw solution from the contaminated FO feed solution stream. The process may further include introducing the diluted draw solution to the RO component to form at least a portion of a RO feed solution stream. The process can further include causing the RO component to produce a permeate solution and a concentrated RO feed solution stream from the RO feed solution stream. The permeate solution includes a purified solvent recovered according to the process.

The process may further include introducing from the RO component a first feed solution stream to the first chamber of the filtration module and onto the first side of the semipermeable membrane. The first feed solution stream includes at least a portion of the concentrated RO feed solution stream. The process may also include introducing from the RO component a second feed solution stream to the second chamber of the filtration module and onto the second side of the semipermeable membrane. The second feed solution also includes at least a portion of the concentrated RO feed solution stream. The osmotic pressure of the first feed solution stream may be approximately equal to the osmotic pressure of the second feed solution stream. Alternatively, the osmotic pressure of the first feed solution stream may be greater than the osmotic pressure of the second feed solution stream.

The process may further include exerting hydrostatic pressure on the first side of the semipermeable membrane such that solvent passes from the first side of the semipermeable membrane to the second side of the semipermeable membrane thereby producing a concentrated first feed solution stream in the first chamber and a diluted second feed solution stream in the second chamber. The process may also include introducing from the second chamber of the module at least a portion of the diluted second feed solution stream to the RO component to be used as at least a portion of the RO feed solution stream. The process may further include introducing from the first chamber of the filtration module at least a portion of the concentrated first feed solution stream to the FO component to form at least a portion of the draw solution.

FIGS. 3A-E illustrates the differences between the presently disclosed OsARO apparatus and technique to the conventional techniques of reverse osmosis (RO), forward osmosis (FO), pressure retarded osmosis (PRO), and pressure assisted forward osmosis (PAFO) processes. The OsARO process differs from RO, FO, PRO, and PAFO processes used in the art. As shown in FIGS. 3A-E, each of these processes uses a semipermeable membrane to separate one or more solutes from a solution.

The above referenced conventional processes can be divided into two categories according to the direction of the permeate flow. In FO, PRO and PAFO, the permeate flows from low osmotic pressure mixture side ($\pi(C2)$) to the high osmotic pressure mixture side ($\pi(C1)$) of the semipermeable membrane. Generally, in an FO system, the hydraulic pressure applied on both sides of the membrane is equal. In a PRO system, feed 1 is introduced at hydraulic pressure P1 and an osmotic pressure $\pi(C1)$ that is higher than the hydraulic pressure P2, osmotic pressure $\pi(C2)$ of feed 2 to result in a permeate flow from feed 2 to feed 1. In a PAFO system, the hydraulic pressure P2 of feed 2 is higher than the hydraulic pressure P1 of the feed 1. While the osmotic pressure $\pi(C1)$ of feed 1 is higher than the osmotic pressure $\pi(C2)$ of feed 2 to result in a permeate flow from feed 2 to feed 1.

The degree of permeation can be calculated as a permeate flux $J_w$. Permeate flux is defined as the volume flowing through the membrane per unit area per unit time.

Conventional RO and OsARO are different than FO, PRO and PAFO. In an RO process, the permeate flows from the feed 1, having a higher hydraulic pressure P1 to feed 2 having a lower hydraulic pressure P2. In RO, the feed 2 initially has no solution (in most cases a pure solvent such as water) and therefore, has no initial solute concentration C2 or corresponding osmotic pressure $\pi(C2)$. In OsARO, the permeate flows from feed 1, having a higher osmotic pressure $\pi(C1)$, to feed 2, having a lower osmotic pressure $\pi(C2)$. In some instances, in OsARO, the concentrations C1 and C2 of feeds 1 and 2, respectively, are the same. The permeate flows from the feed 1 side to the feed 2 side of the semipermeable membrane solely due to a higher applied hydraulic pressure P1 of feed 1 than the applied hydraulic pressure P2 of feed 2.

The difference between conventional RO and OsARO is the origination of the low osmotic pressure mixture feed (C2). In an RO process, no feed 2 is introduced across the membrane; only the permeate flowing from feed 1 exists on the feed 2 side of the membrane. In contrast, in OsARO, a second feed having a concentration C2 is introduced into the stage independently, as demonstrated in FIGS. 1-3. This second feed, reduces the difference in osmotic pressure across the semipermeable membrane and thus decreases the hydrostatic pressure required to cause solvent to flow across the semipermeable membrane, thereby producing a concentrated feed solution and a diluted feed solution.

From above comparisons, it can be seen that the presently disclosed OsARO process differs from previously known processes. Using the presently disclosed OsARO apparatus and techniques, concentrated feed 1 solutions and/or diluted feed 2 solutions can be obtained independently for various applications.

The presently disclosed OsARO process requires specific semipermeable membranes and filtration modules that differ from those membranes and filtration modules known in the art. In particular, the presently disclosed semipermeable membranes and filtration modules are configured to receive a second feed solution stream to a second side of the membrane, while the first side of the membrane is configured to receive a first feed solution stream. By contrast, conventional RO membranes and filtration modules are only configured to receive a single feed solution stream to just one side of the membrane. Therefore, only the permeate flowing from the single feed solution stream across the membrane exists on the second side of the membrane during a RO process.

Filtration membranes are often made from fine or fragile materials that limit the effective operating pressure at which the membranes may be used. In many cases, RO membranes and filtration modules are limited by operating pressures of 70 bars or less. At such pressures, the RO membrane or filtration modules will not produce any more permeate. Another reason that RO modules are limited by operating pressures of 70 bars or less is that high solute concentrations produced by higher operating pressures increases the operating costs of the module. This is due to the lower permeate flux produced per incremental increase in pressure as well as a coincidental increase in fouling of the membrane. These effects are caused by the large concentration polarization that occurs at the surface of the membrane with high solute concentration on one side of the membrane and low solute concentration on the other side of the membrane. Because the permeate quality is of great importance in RO systems, typical RO modules exhibit 99+% salt rejection in order to achieve the requisite single pass RO permeate quality. RO systems operating under high solute concentrations and high pressure conditions may require a second pass, thereby increasing the energy requirements and cost to the system.

The presently disclosed filtration modules, suited for use in the OsARO process, are configured to overcome the operating pressure limitation inherent to conventional RO systems by introducing a second feed solution stream having an osmotic pressure sufficient to reduce the operating pressure necessary to perform the RO process or filtration step. As a result, the presently described membranes and filtration modules may operate at operating pressures up to 120 bar. In at least some instances, the osmotic pressure of the second feed solution stream may be equal to or less than the osmotic pressure of the first feed solution.

The membranes employed in conventional RO applications, without being configured to receive a second feed solution stream on the second side or inner bore of the membrane, are designed to provide a rejection of salts of over 99% for brackish water RO and often as high as 99.8% for Sea Water RO in order to desalinate water sufficient for drinkable use. However, the salt rejection criteria of 99+% may be relaxed for the presently disclosed membranes and filtration modules suited for use according to the presently disclosed OsARO methods and techniques. In OsARO applications, the first feed solution stream and the second feed solution stream may be allowed to mix by crossing the membrane. As a result, the osmotic pressure difference is reduced and the cross membrane flux is increased. By reducing the rejection parameter for the salt species of interest, the pressure needed to increase or decrease salinity may be reduced, thereby saving energy.

In at least some instances, the presently disclosed membranes exhibit a permeate flux of at least 0.18 liters per square meter per hour (LMH) when both sides of the membrane are exposed to a feed solution stream comprising 35,000 ppm solute at a temperature of 25° C. and a transmembrane hydraulic pressure of about 40 bar or about 600 psi. In at least some cases, the solute is NaCl or Seawater.

In at least some instances, the membrane exhibits a salt rejection of between about 60% and about 90% during operation in a desalination or ZLD or near-ZLD wastewater treatment system. In other cases, the membrane exhibits a salt rejection of between about 30% and about 99% or between about 40% and about 95%. In at least some instances, the presently disclosed membranes exhibit a salt rejection of between about 60 percent and about 90 percent when both sides of the membrane are exposed to a feed solution stream comprising 200,000 ppm solute at a temperature of 25° C. and a pressure of about 70 bar or about 1000 psi. In at least some cases, the solute is ammonium sulfate.

The presently disclosed membranes may be configured to operate at a hydrostatic pressure on the second side of the membrane of from about 1% to about 40% of the hydrostatic pressure on the first side of the membrane. In some cases, the presently disclosed membranes may be configured to operate at a hydrostatic pressure on the second side of the membrane of from about 1% to about 25% of the hydrostatic pressure on the first side of the membrane, or from about 1% to about 5% of the hydrostatic pressure on the first side of the membrane. In at least some instances, the presently disclosed membranes may be configured to operate at a hydrostatic pressure on the second side of the membrane in the range of from a lower limit of about 1%, 2%, 3%, 5%, 10%, 12%, 15%, to an upper limit of about 5%, 10%, 12%, 15%, 20%, 25%, 30%, 35%, and 40%, encompassing any value and subset therebetween, of the hydrostatic pressure on the first side of the membrane.

The presently disclosed membranes may be configured to operate at a pressure of from about 10 bar to about 120 bar on the first side of the membrane and at a pressure of from about 2 bar to about 20 bar on the second side of the membrane. In at least some instances, the presently disclosed membranes may be configured to operate at a hydrostatic pressure on the first side of the membrane in the range of from a lower limit of about 10 bar, 15 bar, 20 bar, 25 bar, 30 bar, 35 bar, 40 bar, 45 bar, 50 bar, 55 bar, 60 bar, 65 bar, 70 bar, 75 bar, 80 bar, 85 bar, 90 bar, 95 bar, 100 bar, to an upper limit of about 105 bar, 110 bar, 115 bar, 120 bar, 125 bar, 130 bar, 135 bar, 140 bar, 145 bar, 150 bar, 155 bar, 160 bar, 165 bar, 170 bar, 175 bar, 180 bar, 185 bar, 190 bar, 195 bar, and 200 bar, encompassing any value and subset therebetween.

In at least some instances, the presently disclosed membranes may be configured to operate at a hydrostatic pressure on the second side of the membrane in the range from a lower limit of about 1 bar, 2 bar, 3 bar, 4 bar, 5 bar, 6 bar, 7 bar, 8 bar, 9 bar, 10 bar, 11 bar, 12 bar, 13 bar, 14 bar, 15 bar, to an upper limit of about 5 bar, 6 bar, 7 bar, 8 bar, 9 bar, 10 bar, 11 bar, 12 bar, 13 bar, 14 bar, 15 bar, 16 bar, 17 bar, 18 bar, 19 bar, 20 bar, 21 bar, 22 bar, 23 bar, 24 bar, and 25 bar, encompassing any value and subset therebetween.

The use of the presently disclosed membranes and filtration modules, in conjunction with conventional RO systems may also provide for decreased feed concentrations to existing RO plants, increased water production, and improved water quality. Additionally, the brine produced by the presently disclosed OsARO membranes, filtration modules, and techniques is higher in salinity than that produced by conventional RO systems, allowing the presently disclosed apparatus and methods to be used in the production of concentrated feed streams for zero liquid discharge (ZLD) or near-ZLD applications.

The presently disclosed membranes, such as membranes 115 and 215-218 described above with respect to FIGS. 1 and 2, may be composed of any semipermeable membrane material that possesses the capability to pass one stream component preferentially through it over another. The membrane may be a polymeric membrane, an inorganic membrane, a biological membrane, a biological and inorganic composite membrane, a synthetic organic composite membrane, or any combination thereof. Polymeric membranes may be formed according to a phase inversion process developed by Loeb & Sourirajen so as to form an asymmetric membrane with a gradient of porosity and pore size through the membrane. Such membranes enable the separation of solutes and solvents due to preferential diffusion of one species over another across the membrane.

In at least some instances, the membrane may be an inorganic membrane such as a ceramic membrane, a glass membrane, a metallic membrane, a carbon membrane, a zeolitic membrane, or any combination thereof. Inorganic membranes may be prepared formed according to a sintering process or any other method known in the art.

In some cases, the membrane may be a thin film composite membrane composed of multiple materials. In such cases, the membrane may be formed by coating a porous support layer with a semipermeable membrane layer. A thin active layer coating may, at least in some instances, be composed of the same material as the porous support material.

In at least some instances, the membrane may be a biological membrane that includes lipid bilayers and proteins, in which the proteins are incorporated into one or more lipid bilayers and are capable of selectively transporting solutes across the membrane. Such biological membranes may, in at least some instances, be hybridized with other membranes so as to form a biological and inorganic or synthetic organic composite. An example of a biological and synthetic organic composite membrane is an Aquaporin membrane.

The presently disclosed membranes may include an active skin on the first side of the membrane, or the second side of the membrane, or both the first and second sides of the membrane. The term "active skin," as used herein, denotes a portion of the membrane that is responsible for the rejection of species of interest in order to mitigate fouling of the membrane. Species of interest may include particles, organic and inorganic materials, and microorganisms. Since the presently disclosed membranes are configured to receive feed solutions on both sides of the membrane, each side of the membrane may include an active skin to better reject fouling species during operation. However, at least in some instances, the membrane may include one active skin or no active skin, particularly if one or more of the feed solution streams is pretreated to remove fouling species.

The presently disclosed membranes may be operated at a relatively narrow temperature range close to ambient temperatures or may be operated in conjunction with industrial processes in which heating or cooling of the process stream is not always feasible. In such situations, the membranes may be constructed, at least in part, of materials suitable to higher temperatures, such as polybenzimidazole (PBI) fiber, polysulfone (PSU), polyarylsulfone (PAS), polyarylethersulfone (PAES), polyimide (PI), polyphenylene sulfide (PPS), polyetherketoneketone (PEKK), polyethersulfone (PES), polyetherimide (PEI), polyamide-imide (PAI), polyether ether ketone (PEEK), polyphenylsulfone (PPSU), polyvinylidene difluoride (PVDF), perfluoroalkoxy alkanes (PFAs), regenerated cellulose, and fluorinated ethylene propylene (FEP).

The presently disclosed filtration modules include at least two inlet ports and at least two exit ports. At least one inlet port is configured to receive a first feed solution stream from a first feed solution source while at least one inlet port is configured to receive a second feed solution stream from a second feed solution source. The presently disclosed filtration modules also include at least one exit port configured to expel a concentrated first feed solution stream and at least one exit port configured to expel a produced permeate solution or diluted second feed solution stream.

For example, filtration module 150, depicted in FIG. 1, includes inlet port 181 providing an entryway for the first feed solution stream 141 to enter the first chamber 131 and be received by the first side 121 of membrane 115. Filtration module 150 also includes a first exit port 191 providing for the exit of concentrated first feed solution stream 171 from the first chamber 131. The filtration module 150 also includes a second inlet port 182 that provides an entryway for the second feed solution stream 142 to enter the second chamber and be received by the second side 122 of membrane 115. Filtration module 150 further includes a second exit port 192 providing for the exit of a diluted second feed solution stream 172 from the second chamber 132.

While filtration module 150 is depicted in FIG. 1 as having two inlet ports and two exit ports for a total of four ports, any number of inlet and/or exit ports are within the spirit and scope of the present disclosure, so long as there are at least one inlet port and one exit port in fluidic communication with the first side of the membrane and at least one inlet port and one exit port in fluidic communication with the second side of the membrane. For example, filtration modules having 4, 5, 6, 7, 8, 9, 10, 11, 12, to 100 ports are within the spirit and scope of the present disclosure.

The presently disclosed membranes may be in any form or configuration capable of effectively performing the OsARO processes and techniques disclosed herein. For example, the presently disclosed membrane may be in the form of a parallel leaf, a dynamic membrane, a tubular ceramic membrane, a tubular polymeric membrane, an oscillating membrane, or a Disk and Tube. In at least some instances, the membrane may be a flat sheet membrane in the form of a spiral wound flat sheet membrane, a plate and frame, flat sheet leaves hanging in a feed solution, or folded flat sheets in an enclosure. In other instances, the membrane may be a tubular membrane in the form of a hollow fiber tubular membrane, a hollow fine fiber tubular membrane, a capillary tubular membrane, and a double open tubular membrane without a housing.

Figure 4:
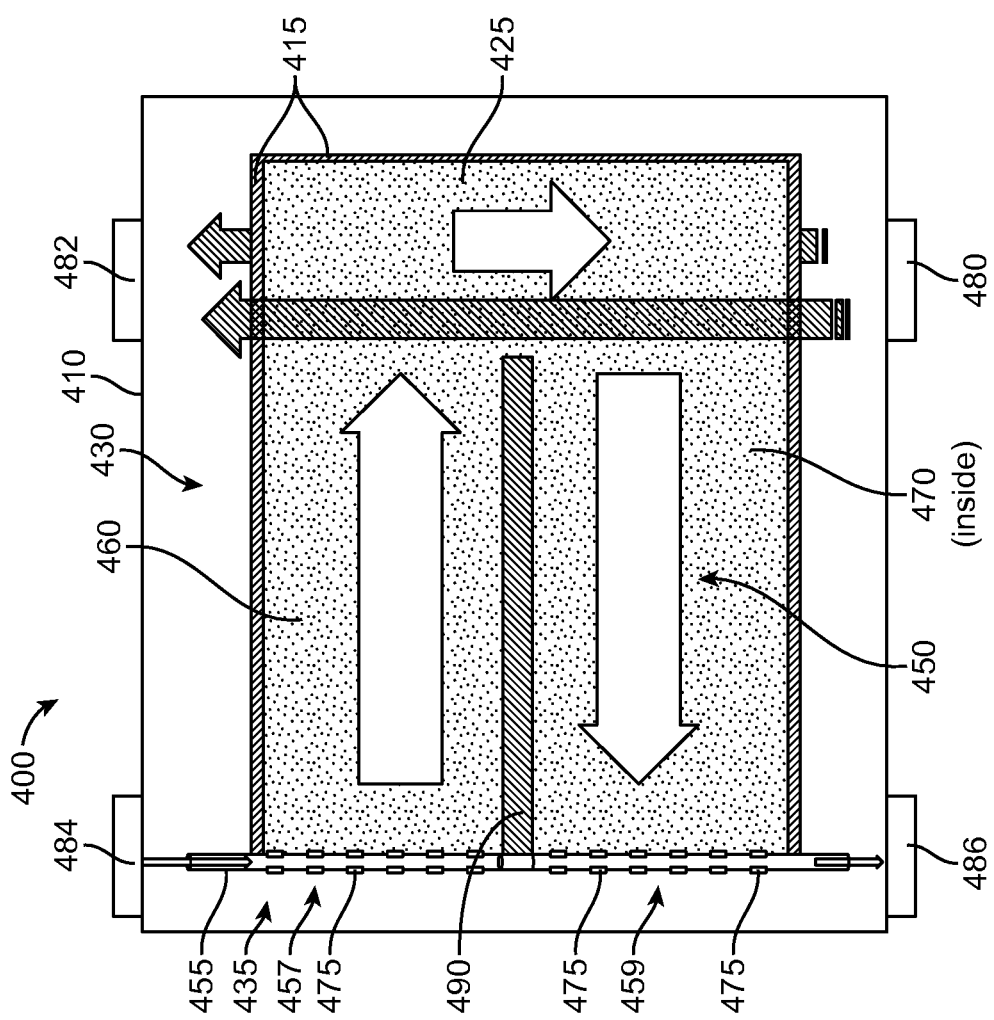
FIG. 4 is diagram of a flat sheet membrane filtering module having a sealing element dividing the permeate tube and characterized by a U-shaped flow pattern within the permeate spacer suited for use in an osmotic pressure assisted reverse osmosis (OsARO) system, according to an example embodiment of the present disclosure.

According to at least one aspect of the present disclosure, the membrane may be a flat sheet membrane, such as that depicted in FIG. 4. FIG. 4 depicts a filtration module 400 having a housing 410, a permeate tube 455, and at least one leaflet 435 formed by a flat sheet membrane 450 arranged to form a membrane envelope 430 around a permeate spacer 425. The permeate spacer 425 includes one or more permeate channels (not shown). The outer side of the membrane envelope 430, or leaflet 435, forms the first side 460 of membrane 450 while the inner side of the membrane envelope 430 forms the second side 470 of the membrane 450. In at least some instances, the membrane envelope 430 may be a folded semipermeable membrane sheet.

The housing 410 of filtration module 400 includes a first inlet port 480 configured to receive a first feed solution stream from a first feed solution source (not shown) and a first exit port 482 configured to expel a concentrated first feed solutions stream from the filtration module 400. Housing 410 further includes a second inlet port 484 configured to receive a second feed solution stream from a second feed solution source (not shown) and a second exit port 486 configured to expel the diluted second feed solution stream.

As depicted in FIG. 4, filtration module 400 includes a permeate tube 455, disposed along an edge of the semipermeable membrane and fluidically coupled with one or more permeate channels (not shown) in permeate spacer 425, via one or more perforations 475 formed in the permeate tube 455. The permeate tube 455 is also coupled with the second exit port 486 of housing 410. The edges of the membrane envelope are sealed by adhesive 415 except that an inside edge of the permeate spacer 425 is open to the perforations 475 of the permeate tube 455. Each semipermeable membrane 450 contained in the housing 410 has an outer side 460 fluidically coupled with the first inlet port 480 and an inner side 470 fluidically coupled with the permeate spacer 425 and the one or more permeate channels. The outer side 460 of the membrane 450 is configured to receive via the first inlet port 480 the first feed solution stream from the first feed solution source. The permeate spacer 425 is fluidically coupled with the second inlet port 484 and thus the inner side 470 of membrane 450 is configured to receive, via the second inlet port 484 and permeate spacer 425, the second feed solution stream from the second feed solution source. Therefore, upon application of hydrostatic pressure to the first side 460 of the membrane 450, the membrane 450 is configured to pass a solvent of the first feed solution stream, in the form of a permeate solution, across the membrane to one or more permeate channels in the permeate spacer 425 and through the second exit port 486 via the permeate tube 455.

Figure 5:
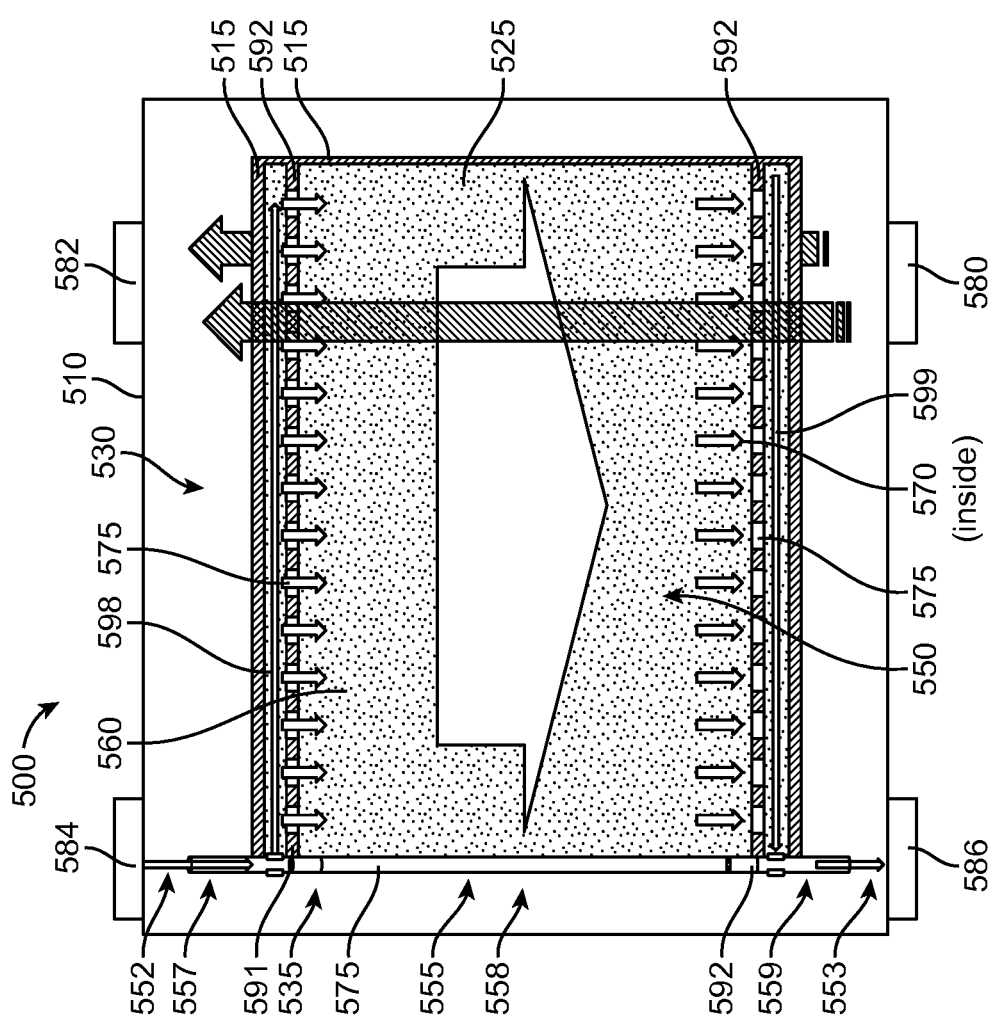
FIG. 5 is a diagram of a flat sheet membrane filtering module having a receiving and collection chamber within the permeate spacer suited for use in an osmotic pressure assisted reverse osmosis (OsARO) system, according to an example embodiment of the present disclosure.
Figure 6:
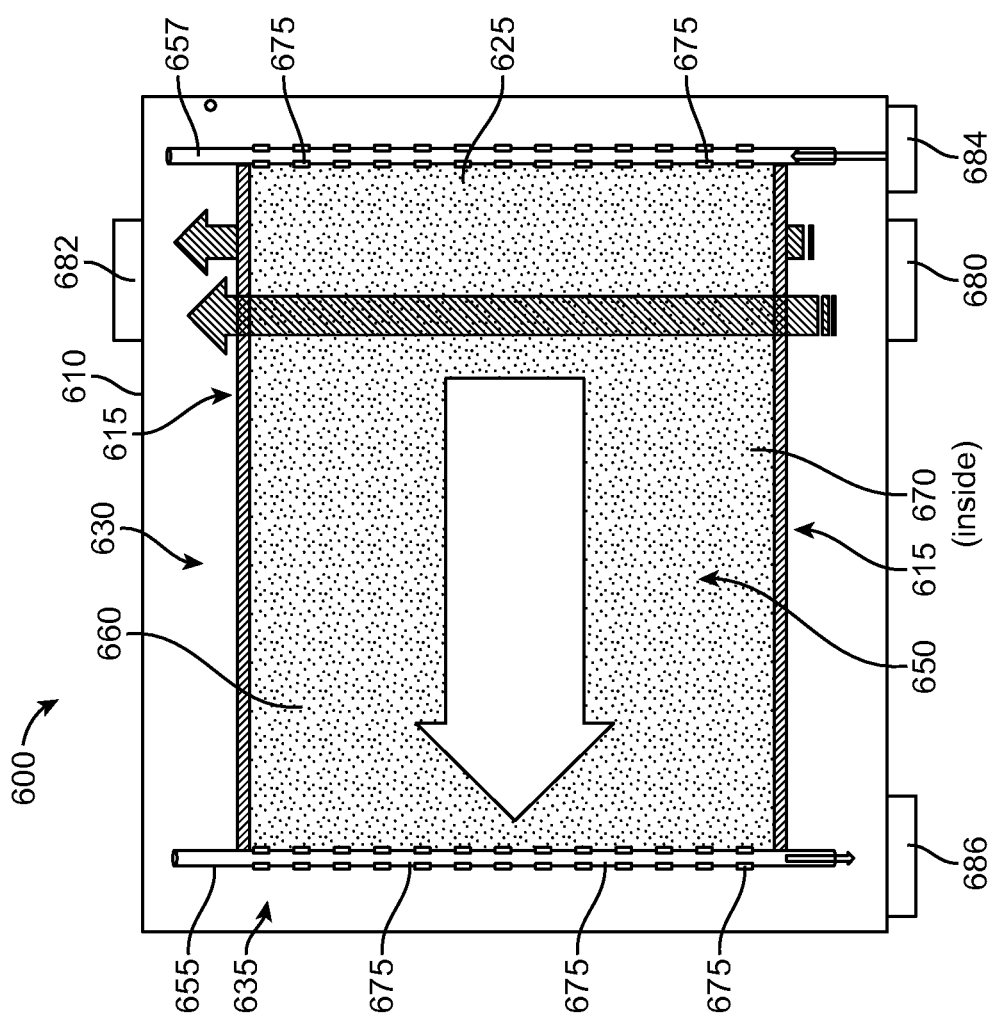
FIG. 6 is a diagram of a flat sheet membrane filtering module having a second tube suited for use in an osmotic pressure assisted reverse osmosis (OsARO) system, according to an example embodiment of the present disclosure.

The presently disclosed flat sheet membranes may have various configurations so long as the flat sheet membrane includes a means for flowing the second feed solution stream to the second side of the membrane (inner side of the membrane envelope). All such configurations are within the spirit and scope of the present disclosure. FIGS. 4-6 illustrated three such configurations as exemplary embodiments of the present disclosure.

As shown in FIG. 4, filtration module 400 further includes a sealing element 490 dividing the permeate tube 455 into a first permeate tube portion 457 and a second permeate tube portion 459. The first permeate tube portion 457 is fluidically coupled with the second inlet port 484 while the second permeate tube portion 459 is fluidically coupled with the second exit port 486. The first permeate tube portion 457 is configured to receive via the second inlet port 484 the second feed solution stream from the second feed solution source and to deliver the second feed solution stream, through one or more perforations 475 in the first permeate tube portion 457, to one or more permeate channels in the permeate spacer 425 so that the second feed solution stream is in fluidic communication with the inner side 470 of the semipermeable membrane 450.

Additionally, sealing element 490 extends longitudinally from the permeate tube 455 into the permeate spacer 425 so as to direct flow of the second feed solution stream from the first permeate tube portion 457 toward the second permeate tube portion 459 in a substantially U-shaped path.

FIG. 5 provides an alternative embodiment of a filtration module having a flat sheet membrane, suited for use in an OsARO system, in which the permeate spacer includes a receiving chamber and a collection chamber. As depicted in FIG. 5, filtration module 500 includes a housing 510, a permeate tube 555, and at least one leaflet 535 formed by a flat sheet membrane 550 arranged to form a membrane envelope 530 around a permeate spacer 525. The permeate spacer 525 includes one or more permeate channels (not shown). The outer side of the membrane envelope 530, or leaflet 535, forms the first side 560 of membrane 550 while the inner side of the membrane envelope 530 forms the second side 570 of the membrane 550. In at least some instances, the membrane envelope 530 may be a folded semipermeable membrane sheet. The edges of the membrane envelope 530 are sealed by adhesive 515.

The housing 510 of filtration module 500 includes a first inlet port 580 configured to receive a first feed solution stream from a first feed solution source (not shown) and a first exit port 582 configured to expel a concentrated first feed solutions stream from the filtration module 500. Housing 510 further includes a second inlet port 584 configured to receive a second feed solution stream from a second feed solution source (not shown) and a second exit port 586 configured to expel the diluted second feed solution stream.

As shown in FIG. 5, filtration module 500 further includes a permeate tube 555, disposed along an edge of the semipermeable membrane 550. A first sealing element 591 disposed in a first end 552 of the permeate tube 555 divides the permeate tube 555 into a first end portion 557 and a central portion 558. The first end portion 557 is fluidically coupled with the second inlet port 584. Filtration module 500 further includes a second sealing element 592 disposed in a second end 553 of the permeate tube 555 so as to divide the permeate tube 555 into a second end portion 559 and the central portion 558. The second end portion 559 is fluidically coupled with the second exit port.

Additionally, the first sealing element 591 extends longitudinally from the permeate tube 555 into the permeate spacer 525 to form a permeate spacer receiving portion 598 fluidically coupled with the first end portion 557 and configured to receive the second feed solution stream from the second feed solution source. The first sealing element 591 further includes one or more perforations 575 configured to permit flow of the second feed solution stream into the permeate spacer 525 and the one or more permeate channels so that the second feed solution stream is in fluidic communication with the inner side 570 of the semipermeable membrane 550.

The second sealing element 592 extends longitudinally from the permeate tube 555 into the permeate spacer 525 to form a permeate spacer collection portion 599 fluidically coupled with the second end portion 559 via one or more perforations 575 in the second sealing element 592.

The semipermeable membrane 550 contained in the housing 510 has an outer side 560 fluidically coupled with the first inlet port 580 and an inner side 570 fluidically coupled with the permeate spacer 525 and the one or more permeate channels. The outer side 560 of the membrane 550 is configured to receive via the first inlet port 580 the first feed solution stream from the first feed solution source. The permeate spacer 525 is fluidically coupled with the second inlet port 584 via the permeate spacer receiving portion 598 and thus the inner side 570 of membrane 550 is configured to receive the second feed solution stream from the second feed solution source, via the second inlet port 584, the permeate spacer receiving portion 598, and permeate spacer 525. Therefore, upon application of hydrostatic pressure to the first side 560 of the membrane 550, the membrane 550 is configured to pass a solvent of the first feed solution stream, in the form of a permeate solution, across the membrane 550 to one or more permeate channels in the permeate spacer 525 and through the second exit port 586 via the permeate spacer collection portion 599 and second end portion 559 of permeate tube 555.

FIG. 6 provides an alternative embodiment of a flat sheet membrane filtration module having a second tube, suited for use in an OsARO system. As depicted in FIG. 6, filtration module 600 includes a housing 610, a permeate tube 655, and at least one leaflet 635 formed by a flat sheet membrane 650 arranged to form a membrane envelope 630 around a permeate spacer 625. The permeate spacer 625 includes one or more permeate channels (not shown). The outer side of the membrane envelope 630, or leaflet 635, forms the first side 660 of membrane 650 while the inner side of the membrane envelope 630 forms the second side 670 of the membrane 650. In at least some instances, the membrane envelope 630 may be a folded semipermeable membrane sheet.

The housing 610 of filtration module 600 includes a first inlet port 680 configured to receive a first feed solution stream from a first feed solution source (not shown) and a first exit port 682 configured to expel a concentrated first feed solutions stream from the filtration module 600. Housing 610 further includes a second inlet port 684 configured to receive a second feed solution stream from a second feed solution source (not shown) and a second exit port 686 configured to expel the diluted second feed solution stream.

As depicted in FIG. 6, filtration module 600 includes a permeate tube 655, disposed along an edge of the semipermeable membrane and fluidically coupled with one or more permeate channels (not shown) in permeate spacer 625, via one or more perforations 675 formed in the permeate tube 655. The permeate tube 655 is also coupled with the second exit port 686 of housing 610. Filtration module 600 further includes a second tube 657 disposed along an opposite edge of the semipermeable membrane 650 from the permeate tube 655. The second tube 657 is fluidically coupled with the permeate spacer 625 and the one or more permeate channels via one or more perforations 675 formed in the second tube 657. The second tube 657 is also fluidically coupled with the second inlet port 684. The edges of the membrane envelope 630 are sealed by adhesive 615 except that an inside edge of the permeate spacer 625 is open to the perforations 675 of the permeate tube 655 and an opposite inside edge of the permeate spacer 625 is open to the perforations 675 of the second tube 657. The second tube 657 is configured to receive via the second inlet port 684 the second feed solution stream from the second feed solution source and deliver the second feed solution stream to the permeate spacer, through one or more perforations 675 in the second tube 657, so that the second feed solution stream is in fluidic communication with the inner side 670 of the membrane 650.

Each semipermeable membrane 650 contained in the housing 610 has an outer side 660 fluidically coupled with the first inlet port 680 and an inner side 670 fluidically coupled with the permeate spacer 625 and the one or more permeate channels. The outer side 660 of the membrane 650 is configured to receive via the first inlet port 680 the first feed solution stream from the first feed solution source. The permeate spacer 625 is fluidically coupled with the second inlet port 684 via the second tube 657 and thus the inner side 670 of membrane 650 is configured to receive the second feed solution stream from the second feed solution source, via the second inlet port 684, the second tube 657, and the permeate spacer 625. Therefore, upon application of hydrostatic pressure to the first side 660 of the membrane 650, the membrane 650 is configured to pass a solvent of the first feed solution stream, in the form of a permeate solution, across the membrane to one or more permeate channels in the permeate spacer 625 and through the second exit port 686 via perforations 675 in the permeate tube 655.

Figure 7:
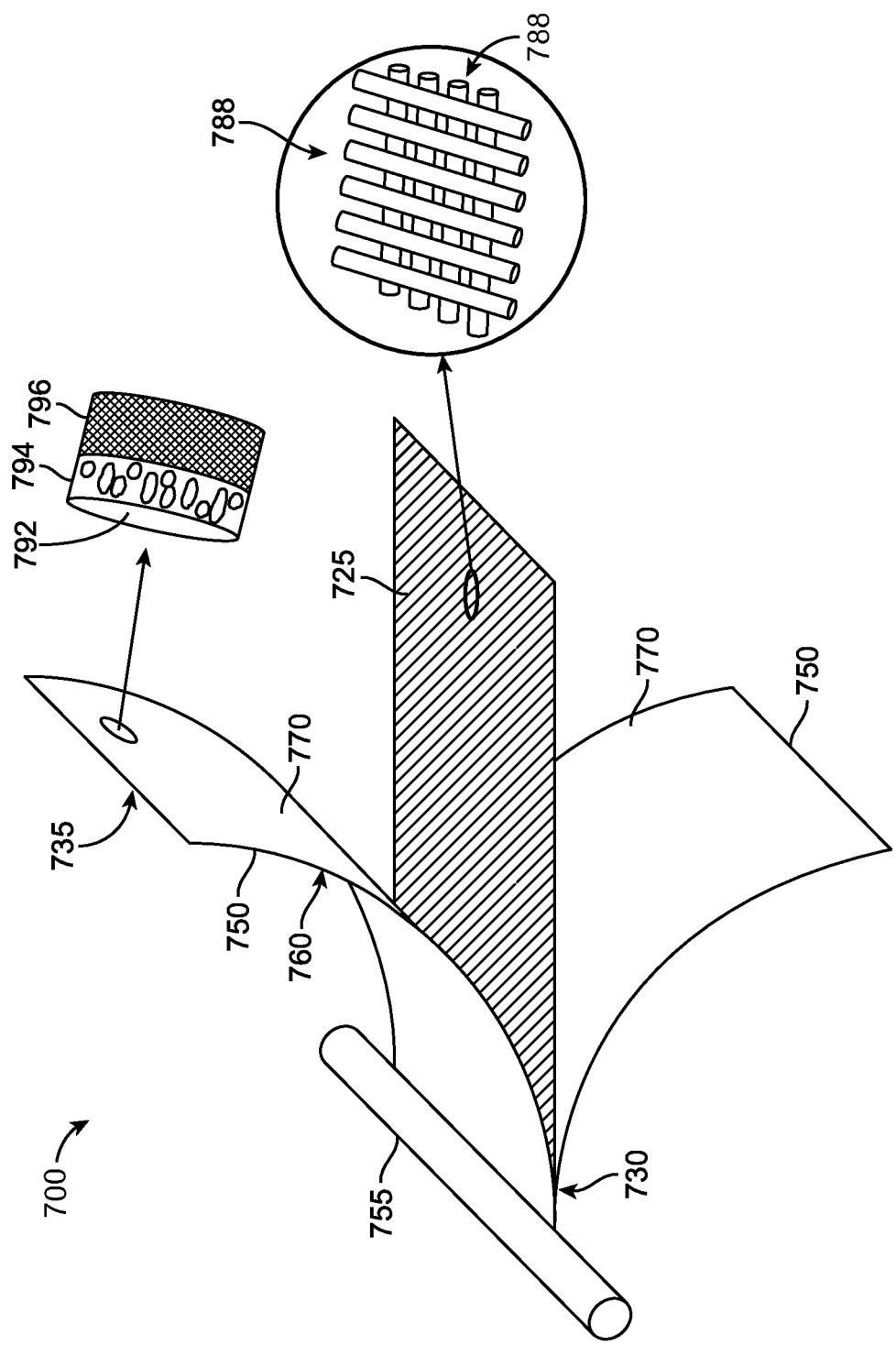
FIG. 7 is a diagram of an exploded view of a flat sheet membrane envelope, according to an example embodiment of the present disclosure.

FIG. 7 is an exploded view of a flat sheet membrane envelope, according to an example embodiment of the present disclosure. As depicted in FIG. 7, filtration module 700 includes a permeate tube 755 and a leaflet 735 formed by a flat sheet membrane 750 arranged to form a membrane envelope 730 around a permeate spacer 725. The leaflet 735 may be formed by a single flat sheet membrane 750 that is folded so as to form one edge of the leaflet 735 and secured or fastened to the permeate tube 755, or alternatively, leaflet 735 may be formed by a first flat sheet membrane 750 and a second flat sheet membrane 750 arranged to form a membrane envelope 730 around the spacer 725 and sealed or glued at two or more edges. The edges of the membrane envelope are sealed by adhesive except that an inside edge of the permeate spacer 725 is open to the perforations (not shown) of the permeate tube 755.

The flat sheet membrane 750 may include an active skin 792 on one or more sides of the flat sheet membrane 750. The flat sheet membrane 750 may also include a porous portion 794 and a support structure 796. The support structure 796 may be a woven or non-woven structure. The permeate spacer 725 includes one or more permeate channels 788.

The outer side of the membrane envelope 730, or leaflet 735, forms the first side 760 of membrane 750 while the inner side of the membrane envelope 730 forms the second side 770 of the membrane 750. The permeate tube 755 is disposed along an edge of the semipermeable membrane 750 and fluidically coupled with one or more permeate channels 788 in permeate spacer 725, via one or more perforations (not shown) formed in the permeate tube 755. Upon the application of hydrostatic pressure to the first side 760 of the membrane 750, the membrane 750 is configured to pass a solvent of the first feed solution stream, in the form of a permeate solution, across the membrane 750 to one or more permeate channels 788 in the permeate spacer 725 and through the second exit port (not shown) via the permeate tube 755.

Figure 8:
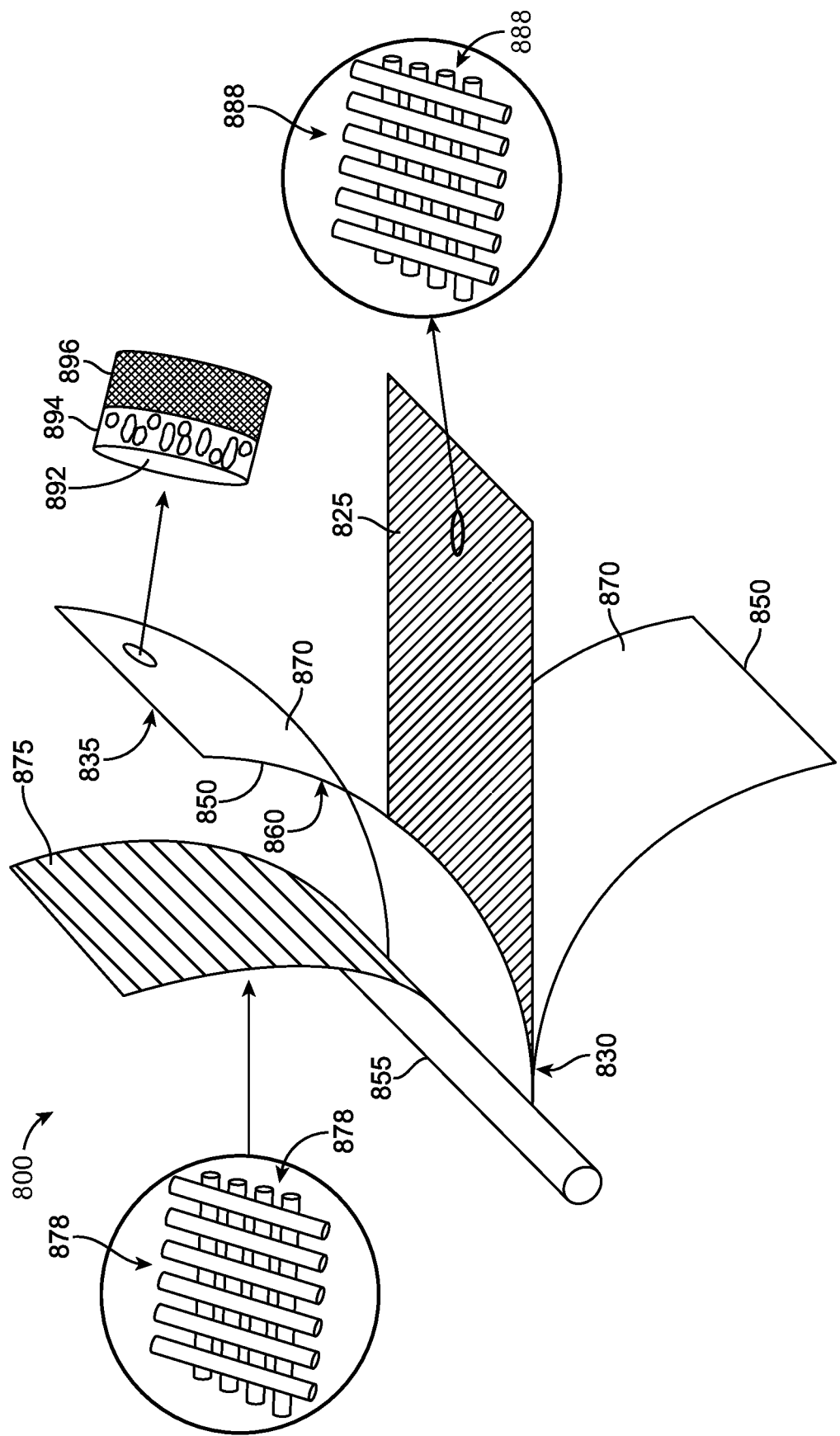
FIG. 8 is a diagram of an exploded view of a flat sheet membrane envelope having a feed spacer, according to an example embodiment of the present disclosure.

FIG. 8 is an exploded view of a flat sheet membrane envelope filtration module having a feed spacer, according to an example embodiment of the present disclosure. As depicted in FIG. 8, filtration module 800 shares similar features with FIG. 7, but additionally includes feed spacer 875 having feed spacer channels 878 providing for flow of the first feed solution stream such that the first feed solution stream flows around the leaflet 835 and contacts a first side 860 of membrane 850. In at least some cases, filtration module 800 is comprised of a plurality of leaflets 835 separated by at least one feed spacer 875. Permeate spacer 825 includes permeate channels 888 providing for flow of the second feed solution stream and permeate on the inside of each leaflet 835 and in contact with the second side 870 of the membrane 850. Feed spacer 875 may be fluidically coupled with one or more first inlet ports (not shown) and one or more first exit ports (not shown).

As depicted in FIG. 8, filtration module 800 includes a permeate tube 855 and a leaflet 835 formed by a flat sheet membrane 850 arranged to form a membrane envelope 830 around a permeate spacer 825. The leaflet 835 may be formed by a single flat sheet membrane 850 that is folded so as to form one edge of the leaflet 835 and secured or fastened to the permeate tube 855, or alternatively, leaflet 835 may be formed by a first flat sheet membrane 850 and a second flat sheet membrane 850 arranged to form a membrane envelope 830 around the spacer 825 and sealed or glued at two or more edges. The edges of the membrane envelope are sealed by adhesive except that an inside edge of the permeate spacer 825 is open to the perforations (not shown) of the permeate tube 855.

The flat sheet membrane 850 may include an active skin 892 on one or more sides of the flat sheet membrane 850. The flat sheet membrane 850 may also include a porous portion 894 and a support structure 896. The support structure 896 may be a woven or non-woven structure. The permeate spacer 825 includes one or more permeate channels 888.

The outer side of the membrane envelope 830, or leaflet 835, forms the first side 860 of membrane 850 while the inner side of the membrane envelope 830 forms the second side 870 of the membrane 850. The permeate tube 855 is disposed along an edge of the semipermeable membrane 850 and fluidically coupled with one or more permeate channels 888 in permeate spacer 825, via one or more perforations (not shown) formed in the permeate tube 855. Upon the application of hydrostatic pressure to the first side 860 of the membrane 850, the membrane 850 is configured to pass a solvent of the first feed solution stream, in the form of a permeate solution, across the membrane 850 to one or more permeate channels 888 in the permeate spacer 825 and through the second exit port (not shown) via the permeate tube 855.

Figure 9:
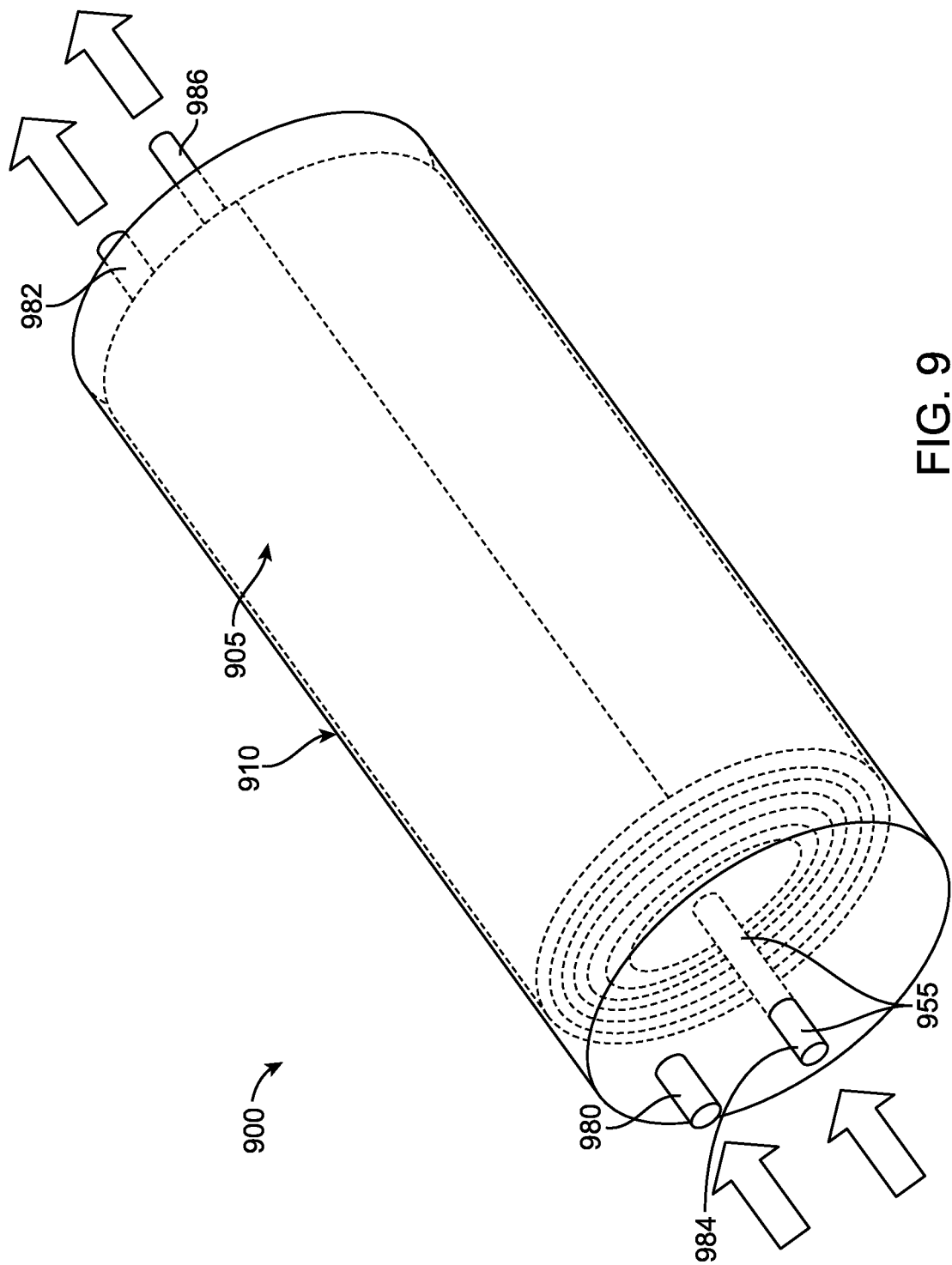
FIG. 9 is a diagram of a spiral wound flat sheet membrane module, according to an example embodiment of the present disclosure.

In at least some instances, the presently disclosed leaflets, such as leaflets 435, 535, 635, 735, and 835 in FIGS. 4-8, may be repeatedly wound on the permeate tube to form a roll or spiral wound flat sheet membrane as shown in FIG. 9. As depicted in FIG. 9, a spiral wound flat sheet membrane module 900 includes a spiral wound flat sheet membrane 905 repeatedly wound on permeate tube 955. Spiral would flat sheet module 900 further includes a housing 910 surrounding the spiral wound flat sheet membrane 905. The housing 910 includes a first inlet port 980 configured to receive a first feed solution stream from a first feed solution source (not shown) and a first exit port 982 configured to expel a concentrated first feed solutions stream from the filtration module 900. Housing 910 further includes a second inlet port 984 configured to receive a second feed solution stream from a second feed solution source (not shown) and a second exit port 986 configured to expel the diluted second feed solution stream.

The presently disclosed flat sheet membranes may be configured to exhibit salt rejection levels of from about 30% to about 99.9% depending on the salt species and application. In at least some instances, the presently disclosed flat sheet membranes may exhibit a salt rejection level of from about 40% to about 95% or from about 60% to about 90%. The presently disclosed flat sheet membranes are capable of operating at a pressure of from about 10 bar to about 120 bar on the outer side of the leaf and at a pressure of from about 2 bar to about 20 bar on the inner side of leaf. In other cases, the flat sheet membranes may be operated at a pressure of from about 30 bar to about 80 bar on the outer side of the leaf and at a pressure of from about 2 bar to about 20 bar on the inner side of the leaf.

Figure 10:
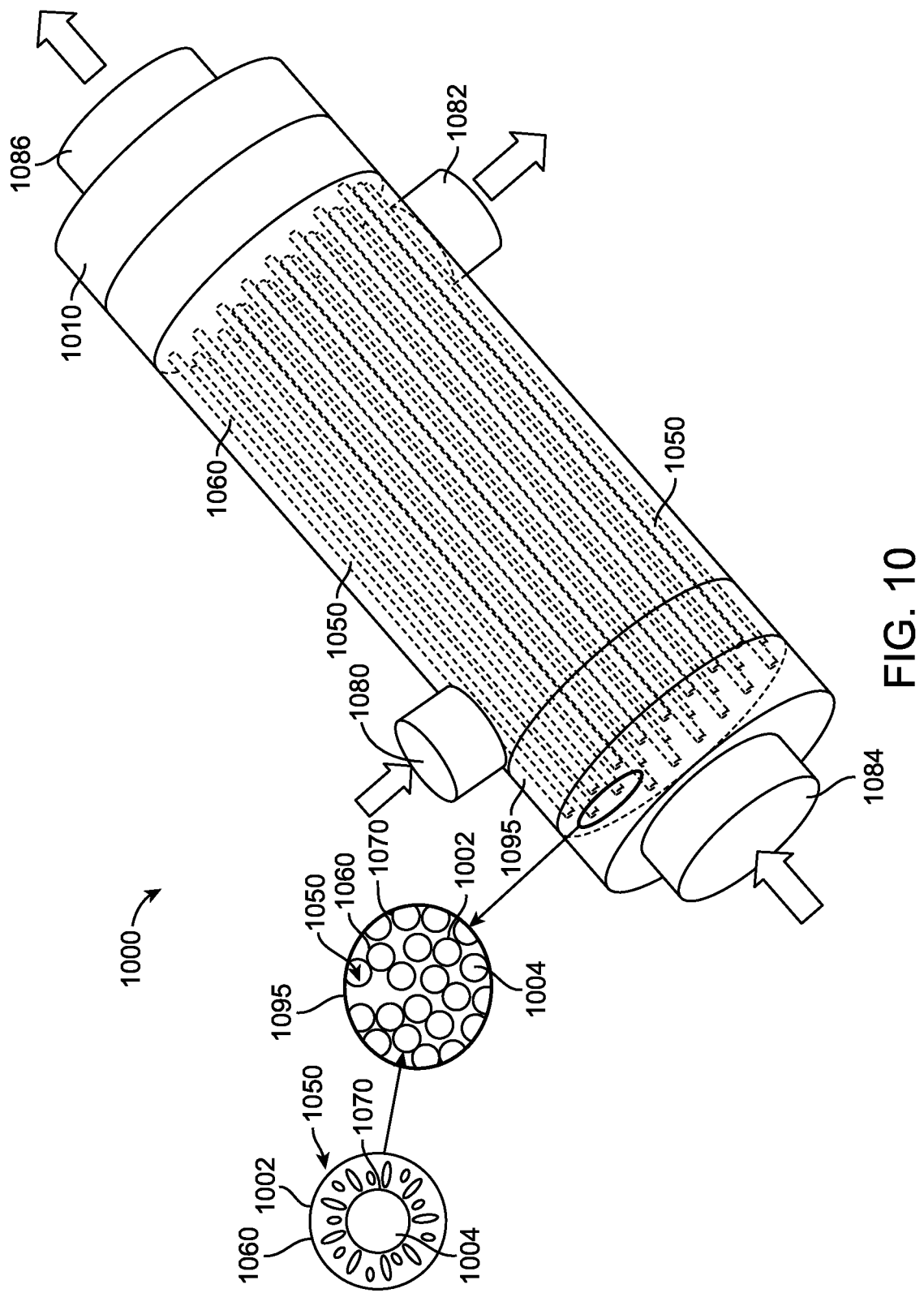
FIG. 10 is a diagram of a tubular hollow fiber membrane module, according to an example embodiment of the present disclosure.

According to at least one aspect of the present disclosure, the membrane may be a tubular hollow fiber membrane having an inner bore and an outer shell, as shown in FIG. 10. FIG. 10 is a diagram of a tubular hollow fiber membrane module 1000, according to an example embodiment of the present disclosure. As depicted in FIG. 10, tubular hollow fiber membrane module 1000 includes a housing 1010 and a plurality of tubular hollow fiber membranes 1050. Each tubular hollow fiber membrane 1050 includes an outer shell 1002 and an inner bore 1004. The first side 1060 of the membrane 1050 may be an outer surface of the outer shell 1002 while the second side 1070 of the membrane 1050 may be an inner surface of the inner bore 1004 of the tubular hollow fiber membrane 1050. During operation, permeate solution passes to the inner bore 1004 of the membrane 1050 upon application of hydrostatic pressure to the first side 1060 of the membrane 1050. Each tubular hollow fiber membrane 1050 is open at both ends and permeate may flow out of one or both ends of the hollow fiber membrane 1050 depending on the configuration of the filtration module 1000. In at least some instances, each tubular hollow fiber membrane 1050 is made, at least in part, of cellulose triacetate.

Each tubular hollow fiber membrane 1050 is configured to receive the second feed solution stream into the inner bore 1004 so that the second feed solution stream contacts the inner surface of the inner bore 1004 and therefore the second side 1070 of the membrane 1050. The applied hydrostatic pressure on the shell causes the second feed solution stream to mix with the permeate passing through the membrane 1050 walls from the first side of the membrane 1060, thereby forming a diluted second feed solution stream. As a result, a diluted second feed solution stream exits the inner bore 1004 of the tubular hollow fiber membrane 1050 while a concentrated first feed solution stream exits the shell side 1070 of the tubular hollow fiber membrane 1050.

The housing 1010 includes a first inlet port 1080 configured to receive a first feed solution stream from a first feed solution source (not shown) and a first exit port 1082 configured to expel a concentrated first feed solutions stream from the filtration module 1000. Housing 1010 further includes a second inlet port 1084 configured to receive a second feed solution stream from a second feed solution source (not shown). The second inlet port 1084 is fluidically coupled with one or more inner bores 1004 of tubular hollow fiber membranes 1050. The housing 1010 further includes a second exit port 1086 configured to receive the diluted second feed solution stream from one or more inner bores 1004 of tubular hollow fiber membranes 1050 and to expel the diluted second feed solution stream from filtration module 1000. Potting material 1095 serves to keep the second feed solution stream separate from the first feed solution stream and facilitates flow of the second feed solution stream through the second inlet port 1084 to the inner bores 1004 of the tubular hollow fiber membranes 1050, or on the opposite end of module 1000, facilitates flow of the diluted second feed solution stream from the inner bores 1004 of tubular hollow fiber membranes 1050 to the second exit port 986 and out of module 1000.

While tubular hollow fiber membranes have been employed in conventional RO applications, without being configured to receive a second feed solution stream on the second side or inner bore of the membrane, such tubular hollow fiber membranes are designed to provide a rejection of salts of over 99% for brackish water RO and often as high as 99.8% for Sea Water RO in order to desalinate water sufficient for drinkable use. However, the salt rejection criteria of 99+% may be relaxed for the presently disclosed membranes and filtration modules suited for use according to the presently disclosed OsARO methods and techniques. In OsARO applications, the first feed solution stream and the second feed solution stream may be allowed to mix by crossing the membrane. As a result, the osmotic pressure difference is reduced and the cross membrane flux is increased. By reducing the rejection parameter for the salt species of interest, the pressure needed to increase or decrease salinity may be reduced, thereby saving energy. The presently disclosed tubular hollow fiber membranes may be configured to exhibit salt rejection levels of between about 30% and about 99.9% depending on the salt species and application. In at least some instances, the presently disclosed tubular hollow fiber membranes may exhibit a salt rejection level of between about 40% and about 95% or between about 60% and about 90%.

The presently disclosed tubular hollow fiber membranes are capable of operating at a pressure of between about 10 bar and about 120 bar on the shell side and at a pressure of between about 2 bar and about 20 bar on the inner bore side of the membrane. In other cases, the tubular hollow fiber membranes may be operated at a pressure of from about 30 bar to about 80 bar on the shell side of the membrane. The tubular hollow fiber membranes may have an internal diameter of from about 63 μm and about 2,000 μm. In some instances, the tubular hollow fiber membranes may have an internal diameter of from about 85 μm to about 230 μm or from about 100 μm to about 150 μm. The thickness of the tubular hollow fiber membranes may be varied to support the operating pressure difference of from about 10 bar to about 120 bar, depending on the application.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A filtration module comprising:
   a semipermeable membrane comprising a first side configured to receive a first feed solution stream from a first feed solution source through a first inlet port and a second side configured to receive a second feed solution stream from a second feed solution source through a second inlet port;

a first exit port configured to exit a concentrated first feed solution stream;

a second exit port configured to exit a diluted second feed solution stream; and at least one leaflet comprising the semipermeable membrane and a permeate spacer comprising one or more permeate channels, the semipermeable membrane arranged to form a membrane envelope around the permeate spacer;

wherein the permeate spacer is fluidically coupled with the second inlet port, wherein the semipermeable membrane is configured to pass a solvent of the first feed solution stream, in the form of a permeate solution, from the first side of the membrane to the second side of the membrane upon application of a first hydrostatic pressure to the first side and a second hydrostatic pressure to the second side of the membrane, the semipermeable membrane configured to operate at the second hydrostatic pressure on the second side from about 1% to about 40% of the first hydrostatic pressure on the first side of the membrane, wherein the first feed solution stream has a first solute concentration and a first osmotic pressure, and the second feed solution stream has a second solute concentration and a second osmotic pressure, wherein the first feed solution source and the second feed solution source are configured such that the first osmotic pressure is greater than the second osmotic pressure, and the second feed solution stream has a greater osmotic pressure than the permeate solution, wherein the semipermeable membrane is configured to allow the first feed solution stream having the first solute concentration and the second feed solution stream having the second solute concentration to mix by crossing the semipermeable membrane to reduce a difference between the first osmotic pressure and the second osmotic pressure.

2. The module according to claim 1, wherein the membrane exhibits a salt rejection of from about 60 percent to about 90 percent, during operation in a desalination, ZLD, or near ZLD wastewater treatment system.

3. An apparatus comprising:
a first feed solution source;
a second feed solution source;
a membrane comprising a first side configured to receive a first feed solution stream from the first feed solution source through a first inlet port and a second side configured to receive a second feed solution stream from the second feed solution source through a second inlet port;
a first exit port configured to exit a concentrated first feed solution stream; and
a second exit port configured to exit a diluted second feed solution stream,
wherein the first feed solution stream has a first solute concentration and a first osmotic pressure, and the second feed solution stream has a second solute concentration and a second osmotic pressure,
wherein the first feed solution source and the second feed solution source are configured such that the first osmotic pressure is greater than the second osmotic pressure, and the second feed solution stream has a greater osmotic pressure than the permeate solution, wherein the first feed solution source is configured to provide a hydrostatic pressure of about 10 bar to about 120 bar on the shell side of the membrane and the second feed solution source is configured to provide a hydrostatic pressure of about 2 bar to about 20 bar on the inner bore side of the membrane, and wherein the membrane is arranged to form a membrane envelope around a permeate spacer, the membrane envelope and permeate spacer comprising a leaflet, the first side of the membrane comprising an outer side of the membrane envelope and the second side of the membrane comprising an inner side of the membrane envelope, and wherein the permeate solution passes to one or more permeate channels in the permeate spacer upon the application of hydrostatic pressure to the first side of the membrane, wherein the permeate spacer is fluidically coupled with the second inlet port, wherein the membrane is configured to allow the first feed solution stream and the second feed solution stream to mix by crossing the membrane to reduce a difference between the first osmotic pressure and the second osmotic pressure.

4. The apparatus according to claim 3, further comprising a permeate tube disposed along an edge of the membrane and fluidically coupled with the permeate spacer, wherein the leaflet is repeatedly wound on the permeate tube in the form of a roll.

5. A desalination, zero liquid discharge (ZLD) or near ZLD wastewater treatment system comprising the module according to claim 1, wherein the membrane of the module exhibits a salt rejection of from about 60 percent to about 90 percent, during operation in a desalination, ZLD, or near ZLD wastewater treatment system.

6. The module according to claim 1, wherein the membrane comprises a membrane in the form of one selected from the group consisting of a parallel leaf, a dynamic membrane, a tubular ceramic membrane, a tubular polymeric membrane, an oscillating membrane, and a Disk and Tube.

7. The module according to claim 1, wherein the membrane comprises either:
a flat sheet membrane having a configuration selected from the group consisting of spiral wound, plate and frame, flat sheet leaves hanging in a feed solution, and folded flat sheets in an enclosure.

8. The module according to claim 1, wherein the membrane is a biological membrane comprising lipid bilayers and proteins, wherein the proteins are incorporated into one or more lipid bilayers and are capable of selectively transporting solutes across the membrane.

9. The module according to claim 1, wherein the first inlet port and the second inlet port are positioned on a first end of the semipermeable membrane, wherein the first exit port and the second exit port are positioned on a second end of the membrane opposite to the first end.

10. The apparatus according to claim 3, wherein the first inlet port and the second inlet port are positioned on a first end of the semipermeable membrane, wherein the first exit port and the second exit port are positioned on a second end of the membrane opposite to the first end.

11. The module according to claim 1, wherein the first feed solution source and the second feed solution source are configured such that the first solute concentration of the first feed solution stream is greater than the second solute concentration of the second feed solution stream.

12. The module according to claim 3, wherein the first feed solution source and the second feed solution source are configured such that the first solute concentration of the first feed solution stream is greater than the second solute concentration of the second feed solution stream.

\* \* \* \* \*